(12) United States Patent
Berenbaum et al.

(10) Patent No.: US 6,665,791 B1
(45) Date of Patent: Dec. 16, 2003

(54) METHOD AND APPARATUS FOR RELEASING FUNCTIONAL UNITS IN A MULTITHREADED VLIW PROCESSOR

(75) Inventors: Alan David Berenbaum, New York City, NY (US); Nevin Heintze, Morristown, NJ (US); Tor E. Jeremiassen, Somerset, NJ (US); Stefanos Kaxiras, Jersey City, NJ (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/538,669

(22) Filed: Mar. 30, 2000

(51) Int. Cl.[7] .................. G06F 15/163; G06F 9/54; G06F 9/50
(52) U.S. Cl. .................. 712/24; 712/231; 709/102; 709/104; 709/106
(58) Field of Search .................. 712/24, 20, 21, 712/23, 245, 227, 231; 709/102, 104, 105, 106, 107, 332, 400, 108

(56) References Cited

U.S. PATENT DOCUMENTS 6,216,220 B1 * 4/2001 Hwang .................. 712/24
6,272,616 B1 * 8/2001 Fernando et al. .......... 712/20

OTHER PUBLICATIONS

Bekerman et al., "Performance and Hardware complexity Tradeoffs in Designing Multithreaded Architectures," IEEE Proceedings of PCAT (1996).
Berekovic et al., "An Algorithm–Hardware–System Approach to VLIW Multimedia Processors," Journal of VLSI Signal Processing 20, pp. 163–180 (1998).
Hirata et al., "A Multithreaded Processor Architecture with Simultaneous Instruction Issuing," Supercomputer 49, IX–3 (May 1992).
Hirata et al., "An Elementary Processor Architecture with Simultaneous Instruction Issuing from Multiple Threads," Computer Architecture News, Association for Computing Machinery, New York, US, vol. 20, No. 2, pp. 136–145, XP000277761 (May 1992).
Mombers et al., "A Multithreaded Multimedia Processor Merging On–Chip Multiprocessors and Distributed Vector Pipelines," Circuits and Systems, ISCAS '99, Proceedings of the 1999 IEEE International Symposium on Orlando, FL, pp. 287–290 (1999).
Tsai et al., "The Superthreaded Architecture: Thread Pipelining with Run–Time Data Dependence Checking and Control Speculation," IEEE Proceedings of PACT, pp. 35–46 (1996).

* cited by examiner

*Primary Examiner*—Daniel H. Pan
(74) *Attorney, Agent, or Firm*—Ryan, Mason & Lewis, LLP

(57) ABSTRACT

A method and apparatus are disclosed for releasing functional units in a multithreaded very large instruction word (VLIW) processor. The functional unit release mechanism can retrieve the capacity lost due to multiple cycle instructions. The functional unit release mechanism of the present invention permits idle functional units to be reallocated to other threads, thereby improving workload efficiency. Instruction packets are assigned to functional units, which can maintain their state, independent of the issue logic. Each functional unit has an associated state machine (SM) that keeps track of the number of cycles that the functional unit will be occupied by a multiple-cycle instruction. Functional units do not reassign themselves as long as the functional unit is busy. When the instruction is complete, the functional unit can participate in functional unit allocation, even if other functional units assigned to the same thread are still busy. The functional unit release approach of the present invention allows the functional units that are not associated with a multiple-cycle instruction to be allocated to other threads while the blocked thread is waiting, thereby improving throughput of the multithreaded VLIW processor. Since the state is associated with each functional unit separately from the instruction issue unit, the functional units can be assigned to threads independently of the state of any one thread and its constituent instructions.

19 Claims, 5 Drawing Sheets

310 { L3: ADD R0, R1, R2
L2: SUB R3, R4, R2
L1: OR R6, R1, R5

METHOD AND APPARATUS FOR RELEASING FUNCTIONAL UNITS IN A MULTITHREADED VLIW PROCESSOR

CROSS-REFERENCE TO RELATED APPLICATIONS

The present invention is related to U.S. patent application Ser. No. 09/538,670 entitled "Method and Apparatus for Allocating Functional Units in a Multithreaded Very Large Instruction Word (VLIW) Processor"; U.S. patent application Ser. No. 09/538,755 entitled "Method and Apparatus for Splitting Packets in a Multithreaded Very Large Instruction Word Processor"; and U.S. patent application Ser. No. 09/538,757 entitled "Method and Apparatus for Identifying Splittable Packets in a Multithreaded VLIW Word Processor," each filed contemporaneously herewith, assigned to the assignee of the present invention and incorporated by reference herein.

FIELD OF THE INVENTION

The present invention relates generally to multithreaded processors, and, more particularly, to a method and apparatus for releasing functional units in such multithreaded processors.

BACKGROUND OF THE INVENTION

Computer architecture designs attempt to complete workloads more quickly. A number of architecture designs have been proposed or suggested for exploiting program parallelism. Generally, an architecture that can issue more than one operation at a time is capable of executing a program faster than an architecture that can only issue one operation at a time. Most recent advances in computer architecture have been directed towards methods of issuing more than one operation at a time and thereby speed up the operation of programs. FIG. 1 illustrates a conventional microprocessor architecture 100. Specifically, the microprocessor 100 includes a program counter (PC) 110, a register set 120 and a number of functional units (FUs) 130-N. The redundant functional units 130-1 through 130-N provide the illustrative microprocessor architecture 100 with sufficient hardware resources to perform a corresponding number of operations in parallel.

An architecture that exploits parallelism in a program issues operands to more than one functional unit at a time to speed up the program execution. A number of architectures have been proposed or suggested with a parallel architecture, including superscalar processors, very long instruction word processors and multithreaded processors, each discussed below in conjunction with FIGS. 2, 4 and 5, respectively. Generally, a superscalar processor utilizes hardware at run-time to dynamically determine if a number of operations from a single instruction stream are independent, and if so, the processor executes the instructions using parallel arithmetic and logic units (ALUs). Two instructions are said to be independent if none of the source operands are dependent on the destination operands of any instruction that precedes them. A very long instruction word processor evaluates the instructions during compilation and groups the operations appropriately, for parallel execution, based on dependency information. A multithreaded processor, on the other hand, executes more than one instruction stream in parallel, rather than attempting to exploit parallelism within a single instruction stream.

A superscalar processor architecture 200, shown in FIG. 2, has a number of functional units that operate independently, in the event each is provided with valid data. For example, as shown in FIG. 2, the superscalar processor 200 has three functional units embodied as arithmetic and logic units 230-N, each of which can compute a result at the same time. The superscalar processor 200 includes a front-end section 208 having an instruction fetch block 210, an instruction decode block 215, and an instruction sequencing unit 220 (issue block). The instruction fetch block 210 obtains instructions from an input queue 205 of a single threaded instruction stream. The instruction sequencing unit 220 identifies independent instructions that can be executed simultaneously in the available arithmetic and logic units 230-N, in a known manner. The refine block 250 allows the instructions to complete, and also provides buffering and reordering for writing results back to the register set 240.

In the program fragment 310 shown in FIG. 3, instructions in locations L1, L2 and L3 are independent, in that none of the source operands in instructions L2 and L3 are dependent on the destination operands of any instruction that precedes them. When the program counter is set to location L1, the instruction sequencing unit 220 will look ahead in the instruction stream and detect that the instructions at L2 and L3 are independent, and thus all three can be issued simultaneously to the three available functional units 230-N. For a more detailed discussion of superscalar processors, see, for example, James. E. Smith and Gurindar. S. Sohi, "The Microarchitecture of Superscalar Processors," Proc. of the IEEE (December 1995), incorporated by reference herein.

As previously indicated, a very long instruction word processor 400, shown in FIG. 4, relies on software to detect data parallelism at compile time from a single instruction stream, rather than using hardware to dynamically detect parallelism at run time. A very long instruction word compiler, when presented with the source code that was used to generate the code fragment 310 in FIG. 3, would detect the instruction independence and construct a single, very long instruction comprised of all three operations. At run time, the issue logic of the processor 400 would issue this wide instruction in one cycle, directing data to all available functional units 430-N. As shown in FIG. 4, the very long instruction word processor 400 includes an integrated fetch/decode block 420 that obtains the previously grouped instructions 410 from memory. For a more detailed discussion of very long instruction word processors, see, for example, Burton J. Smith, "Architecture and Applications of the HEP Multiprocessor Computer System," SPIE Real Time Signal Procesing IV, 241–248 (1981), incorporated by reference herein.

One variety of very long instruction word processors, for example, represented by the Multiflow architecture, discussed in Robert P. Colwell et al., "A VLIW Architecture for a Trace Scheduling Compiler," IEEE Transactions on Computers (August 1988), uses a fixed-width instruction, in which predefined fields direct data to all functional units 430-N at once. When all operations specified in the wide instruction are completed, the processor issues a new, multi-operation instruction. Some more recent very long instruction word processors, such as the C6x processor commercially available from Texas Instruments, of Dallas, Tex. and the EPIC IA-64 processor commercially available from Intel Corp, of Santa Clara, Calif., instead use a variable-length instruction packet, which contains one or more operations bundled together.

A multithreaded processor 500, shown in FIG. 5, gains performance improvements by executing more than one instruction stream in parallel, rather than attempting to exploit parallelism within a single instruction stream. The multithreaded processor 500 shown in FIG. 5 includes a program counter 510-N, a register set 520-N and a functional unit 530-N, each dedicated to a corresponding instruction stream N. Alternate implementations of the multithreaded processor 500 have utilized a single functional unit 530, with several register sets 520-N and program counters 510-N. Such alternate multithreaded processors 500 are designed in such a way that the processor 500 can switch instruction issue from one program counter/register set 510-N/520-N to another program counter/register set 510-N/520-N in one or two cycles. A long latency instruction, such as a LOAD instruction, can thus be overlapped with shorter operations from other instruction streams. The TERA MTA architecture, commercially available from Tera Computer Company, of Seattle, Wash., is an example of this type.

An extension of the multithreaded architecture 500, referred to as Simultaneous Multithreading, combines the superscalar architecture, discussed above in conjunction with FIG. 2, with the multithreaded designs, discussed above in conjunction with FIG. 5. For a detailed discussion of Simultaneous Multithreading techniques, see, for example, Dean Tullsen et al., "Simultaneous Multithreading: Maximizing On-Chip Parallelism," Proc. of the 22nd Annual Int'l Symposium on Computer Architecture, 392–403 (Santa Margherita Ligure, Italy, June 1995), incorporated by reference herein. Generally, in a Simultaneous Multithreading architecture, there is a pool of functional units, any number of which may be dynamically assigned to an instruction which can issue from any one of a number of program counter/register set structures. By sharing the functional units among a number of program threads, the Simultaneous Multithreading architecture can make more efficient use of hardware than that shown in FIG. 5.

While the combined approach of the Simultaneous Multithreading architecture provides improved efficiency over the individual approaches of the superscalar architecture or the multithreaded architecture, Simultaneous Multithreaded architectures still require elaborate issue logic to dynamically examine instruction streams in order to detect potential parallelism. A need therefore exists for a multithreaded processor architecture that does not require a dynamic determination of whether or not two instruction streams are independent. A further need exists for a multithreaded architecture that provides simultaneous multithreading.

SUMMARY OF THE INVENTION

Generally, a method and apparatus are disclosed for releasing functional units that can retrieve the capacity lost due to multiple cycle instructions in a multithreaded very large instruction word processor. The present invention combines the techniques of conventional very long instruction word architectures and conventional multithreaded architectures. The combined architecture of the present invention reduces execution time within an individual program, as well as across a workload. In a conventional multithreaded very large instruction word architecture, one multi-cycle instruction within a multiple instruction packet will occupy all assigned functional units for the duration of the multiple-cycle instruction, even though the other instructions in the packet take only a single cycle. The present invention provides a functional unit release that permits idle functional units to be reallocated to other threads, thereby improving workload efficiency.

The present invention assigns instruction packets to functional units, which can maintain their state, independent of the issue logic, rather than the conventional approach of assigning functional units to an instruction packet. In the multithreaded very long instruction word architecture of the present invention each functional unit has an associated state machine (SM) that keeps track of the number of cycles that the functional unit will be occupied by a multiple-cycle instruction. Thus, the functional unit does not reassign itself as long as the functional unit is busy. When the instruction is complete, the functional unit can participate in functional unit allocation, even if other functional units assigned to the same thread are still busy.

Thus, the functional unit release approach of the present invention allows the functional units that are not associated with a multiple-cycle instruction to be allocated to other threads while the blocked thread is waiting, thereby improving throughput of the multithreaded very long instruction word processor. Since the state is associated with each functional unit separately from the instruction issue unit, the functional units can be assigned to threads independently of the state of any one thread and its constituent instructions.

The present invention utilizes a compiler to detect parallelism in a multithreaded processor architecture. Thus, a multithreaded very long instruction word architecture is disclosed that exploits program parallelism by issuing multiple instructions, in a similar manner to single threaded very long instruction word processors, from a single program sequencer, and also supporting multiple program sequencers, as in simultaneous multithreading but with reduced complexity in the issue logic, since a dynamic determination is not required. The present invention allocates instructions to functional units to issue multiple very long instruction word instructions to multiple functional units in the same cycle. The allocation mechanism of the present invention occupies a pipeline stage just before arguments are dispatched to functional units. Generally, the allocate stage determines how to group the instructions together to maximize efficiency, by selecting appropriate instructions and assigning the instructions to the functional units.

A more complete understanding of the present invention, as well as further features and advantages of the present invention, will be obtained by reference to the following detailed description and drawings.

DETAILED DESCRIPTION

Figure 1:
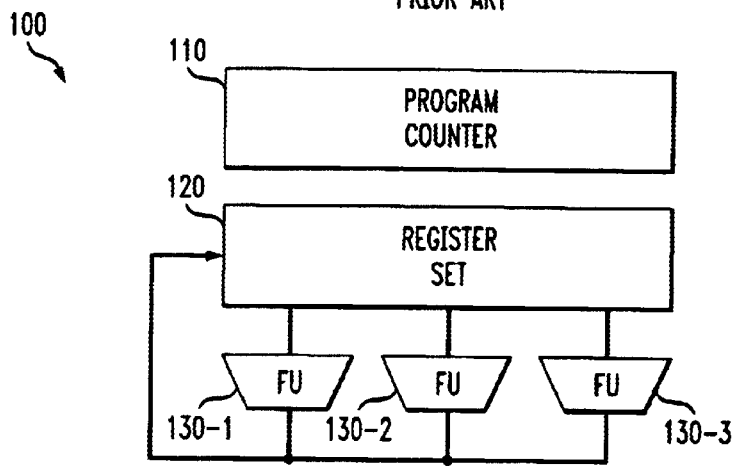
FIG. 1 illustrates a conventional generalized microprocessor architecture.
Figure 2:
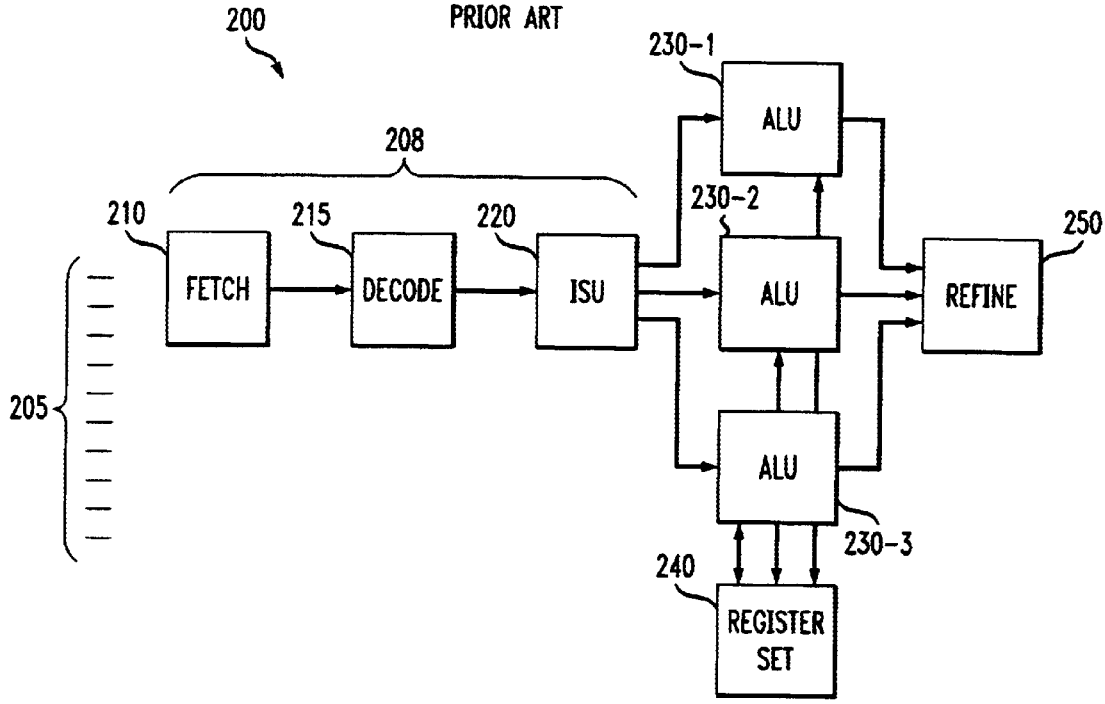
FIG. 2 is a schematic block diagram of a conventional superscalar processor architecture.
Figures 3, 4:
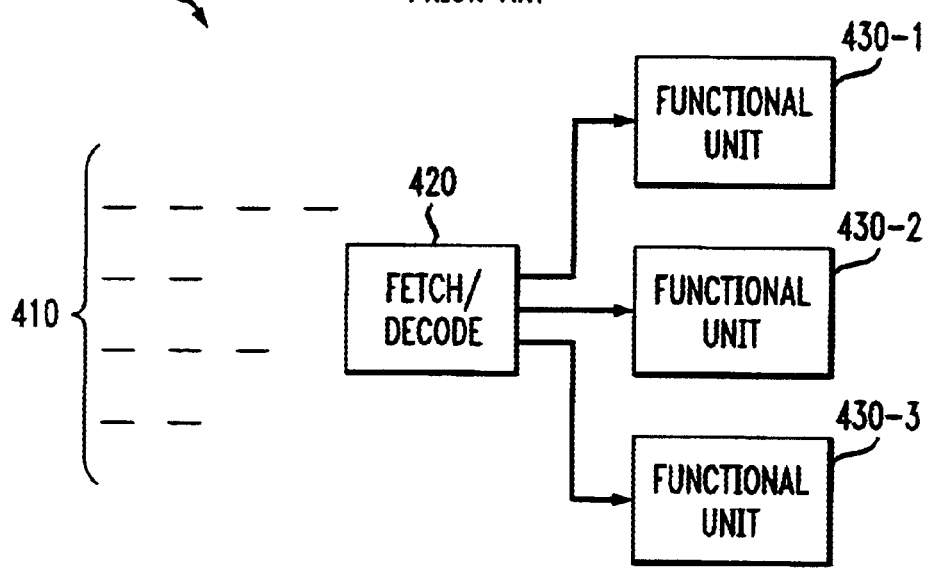
FIG. 3 is a program fragment illustrating the independence of operations.
FIG. 4 is a schematic block diagram of a conventional very long instruction word processor architecture.
Figure 5:
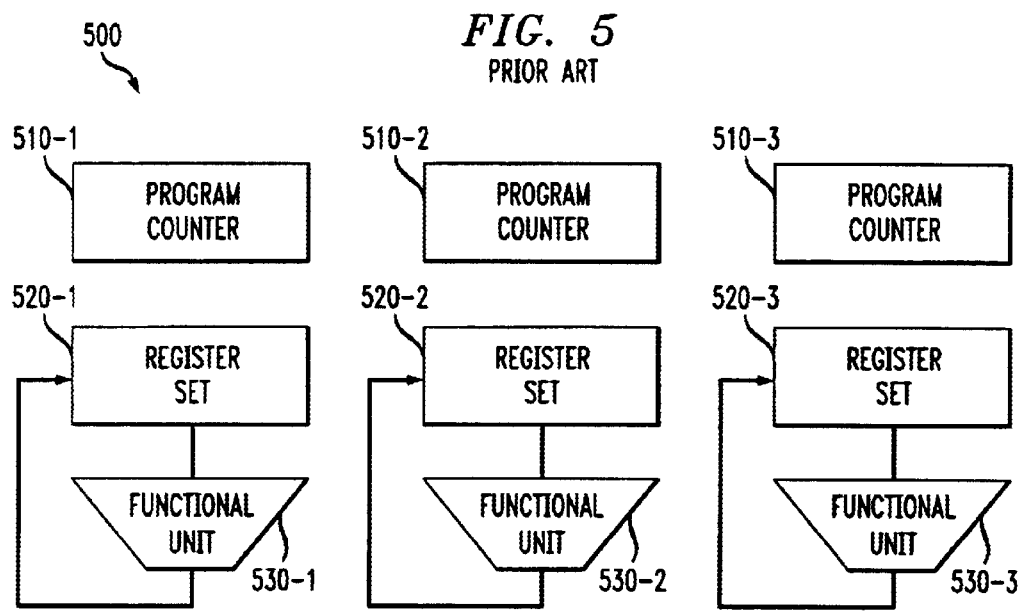
FIG. 5 is a schematic block diagram of a conventional multithreaded processor.
Figure 6:
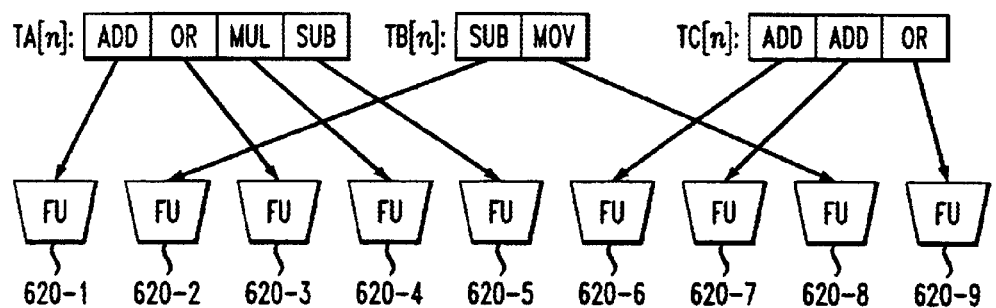
FIG. 6 illustrates a multithreaded very long instruction word processor in accordance with the present invention.

FIG. 6 illustrates a Multithreaded very long instruction word processor 600 in accordance with the present invention. As shown in FIG. 6, there are three instruction threads, namely, thread A (TA), thread B (TB) and thread C (TC), each operating at instruction number n. In addition, the illustrative Multithreaded very long instruction word processor 600 includes nine functional units 620-1 through 620-9, which can be allocated independently to any thread TA-TC. Since the number of instructions across the illustrative three threads TA-TC is nine and the illustrative number of available functional units 620 is also nine, then each of the instructions from all three threads TA-TC can issue their instruction packets in one cycle and move onto instruction n+1 on the subsequent cycle.

It is noted that there is generally a one-to-one correspondence between instructions and the operation specified thereby. Thus, such terms are used interchangeably herein. It is further noted that in the situation where an instruction specifies multiple operations, it is assumed that the multithreaded very long instruction word processor 600 includes one or more multiple-operation functional units 620 to execute the instruction specifying multiple operations. An example of an architecture where instructions specifying multiple operations may be processed is a complex instruction set computer (CISC).

In a conventional single-threaded very long instruction word architecture, all operations in an instruction packet are issued simultaneously. There are always enough functional units available to issue a packet. When an operation takes multiple cycles, the instruction issue logic may stall, because there is no other source of operations available. For example, during a multiple-cycle memory access instruction that is delayed by a cache miss, the instruction issue logic is blocked for an indefinite period of time, that cannot be determined at compile time. During this latency period, no instructions can be scheduled by the compiler, so no instructions are available for issue. In a multithreaded very long instruction word processor in accordance with the present invention, on the other hand, these restrictions do not apply. When an instruction packet stalls because of a multi-cycle operation, there are other operations available, at the head of other threads.

Figure 7:
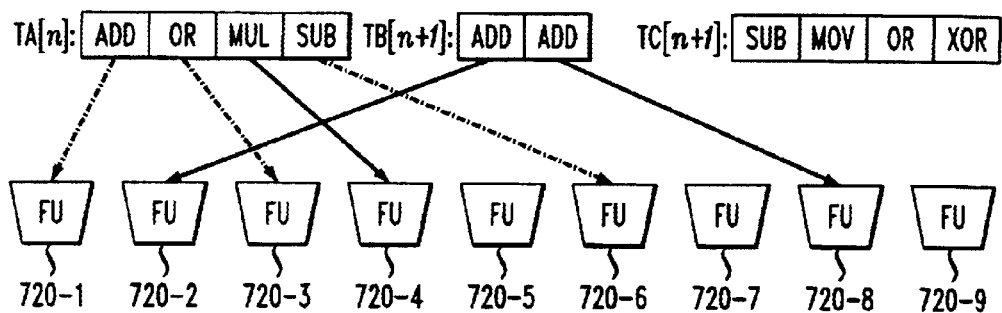
FIG. 7 illustrates the next cycle, at instruction n+1, of the three threads TA-TC shown in FIG. 6, for a conventional multithreaded implementation.

FIG. 7 illustrates the next cycle, at instruction n+1, of the three threads TA-TC, discussed above in conjunction with FIG. 6, for a conventional multithreaded implementation (without the benefit of the present invention). As shown in FIGS. 6 and 7, if the MUL operation in thread A of FIGS. 6 and 7 takes two cycles and the other three operations in thread A take one cycle, then all four functional units assigned to thread A are busy for two cycles and cannot be assigned to other threads TB-TC. FIG. 7 illustrates a possible consequence. The instruction packet at instruction n in thread A requires four functional units 720 for both the cycle represented in FIG. 6 and the subsequent cycle in FIG. 7. The instruction packet from location n+1 in thread B requires two functional units, and is assigned two of the remaining functional units 720-2 and 720-8. However, the instruction packets in location n+1 in thread C require four functional units, and only three are available. Thread C therefore stalls and as a result, three functional units are not utilized.

Figure 8:
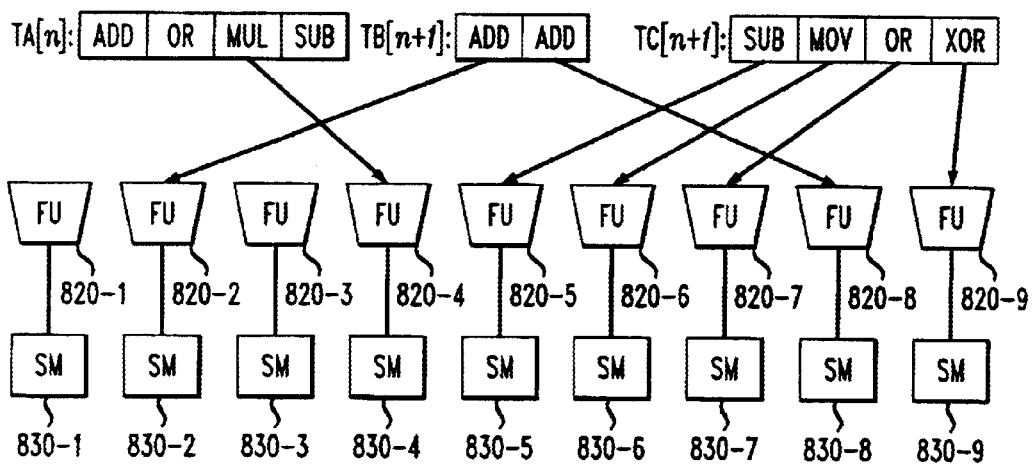
FIG. 8 illustrates the next cycle, at instruction n+1, of the three threads TA-TC shown in FIG. 6, for a multithreaded implementation in accordance with the present invention.

The present invention provides a method and apparatus for releasing the functional units that can retrieve the lost capacity due to multiple cycle instructions. Instead of assigning functional units to an instruction packet, instruction packets are assigned to functional units, which can maintain their state, independent of the issue logic. As shown in FIG. 8, each functional unit 820-N has an associated state machine 830-N, discussed further below in conjunction with FIG. 9, that keeps track of the number of cycles that the functional unit 820-N is occupied by a multiple-cycle operation. Thus, the functional unit 820-N does not reassign itself as long as the functional unit 820-N is busy. When the operation is complete, the functional unit 820-N can participate in functional unit allocation, even if other functional units 820 assigned to the same thread are still busy.

Thus, by implementing the functional unit release approach of the present invention, the functional units that are not associated with a multiple-cycle instruction can be allocated to other threads while the blocked thread is waiting, thereby improving throughput of the multithreaded very long instruction word processor 500. Since the state is associated with each functional unit separately from the instruction issue unit, the functional units can be assigned to threads independently of the state of any one thread and its constituent instructions.

FIG. 8 illustrates the next cycle, at instruction n+1, of the three threads TA-TC, discussed above in conjunction with FIG. 6, in accordance with the present invention. As in FIG. 6, the MUL operation takes two cycles, and the instruction packet at location n+1 for thread C requires four functional units. After the first cycle, three of the four functional units assigned to thread A (functional units 620-1, 620-3, 620-4 and 620-5 in FIG. 6) are freed, so there are eight functional units available for assignment to threads B and C for the cycle n+1. Since threads TB and TC require only six functional units 820, neither thread TB or TC stalls, and a cycle is saved compared to the configuration in FIG. 7.

Figure 9:
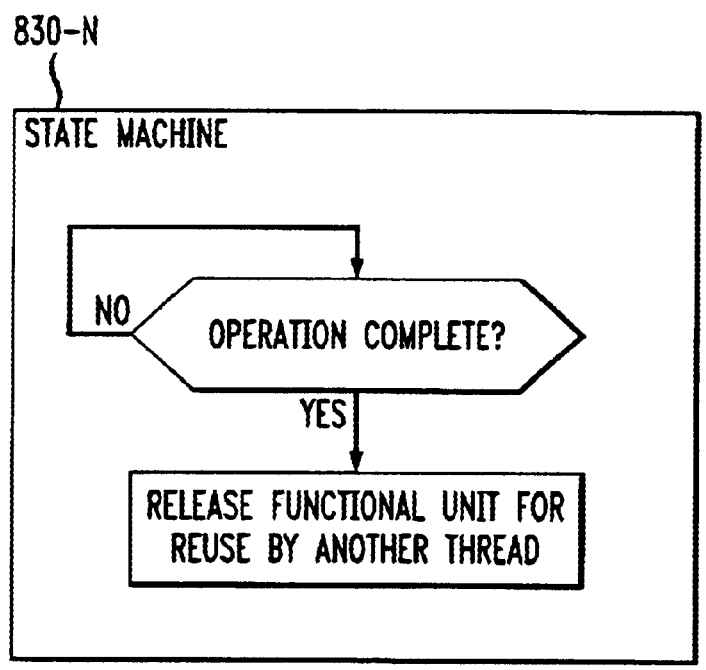
FIG. 9 illustrates an implementation of the state machine shown in FIG. 8.

FIG. 9 illustrates an implementation of the state machine 830-N of FIG. 8. As shown in FIG. 9, the state machine 830-N continuously monitors the execution of a multiple-cycle operation and keeps track of the number of cycles that the functional unit 820-N is occupied. Once the state machine 830-N determines that the operation is complete, the state machine 830-N releases the functional unit for reuse by another thread. In one implementation, the state machine 830-N determines that the operation is complete according a maximum execution time specified for each operation.

It is to be understood that the embodiments and variations shown and described herein are merely illustrative of the principles of this invention and that various modifications may be implemented by those skilled in the art without departing from the scope and spirit of the invention.

We claim:

1. A multi threaded very large instruction word processor, comprising:
   a plurality of functional units for executing instructions from a multithreaded instruction stream; and
   a functional unit release mechanism that reallocates at least one of said functional units to another thread when a currently executing instruction executed by said at least one functional unit is complete in response to an indicator, wherein said indicator indicates a time that said currently executing instruction will be complete.

2. The multithreaded very large instruction word processor of claim 1, wherein said functional unit release mechanism monitors a number of cycles that each functional unit will be occupied.

3. The multithreaded very large instruction word processor of claim 1, wherein said at least one functional unit includes a state machine for maintaining state information.

4. The multithreaded very large instruction word processor of claim 3, wherein said state machine monitors a number of cycles that said at least one functional unit will be occupied by a multiple-cycle instruction.

5. The multithreaded very large instruction word processor of claim 3, wherein said functional unit release mechanism detects when said at least one functional unit is idle.

6. A multithreaded very large instruction word processor, comprising:
   a plurality of functional units for executing instructions from a multithreaded instruction stream; and
   a state machine associated with at least one of said functional units for monitoring a number of cycles that said at least one functional unit will be occupied, said state machine reallocating said at least one functional unit when a currently executing instruction is complete by generating an indicator wherein said indicator indicates a time that said currently executing instruction will be complete.

7. The multithreaded very large instruction word processor of claim 6, wherein said state machine maintains state information.

8. The multithreaded very large instruction word processor of claim 7, wherein said state machine monitors a number of cycles that said at least one functional unit will be occupied by a multiple-cycle instruction.

9. The multithreaded very large instruction word processor of claim 6, wherein said state machine detects when said at least one functional unit is idle.

10. A method of processing instructions from a multithreaded instruction stream in a multithreaded very large instruction word processor, comprising the steps of:
    executing said instructions using a plurality of functional units; and
    reallocating at least one of said functional units to another thread when a currently executing instruction executed by said at least one functional unit is complete in response to an indicator, wherein said indicator indicates a time that said currently executing instruction will be complete.

11. The method of claim 10, wherein said relocating step further comprises the step of monitoring a number of cycles that each functional unit will be occupied.

12. The method of claim 10, further comprising the step of maintaining state information for said at least one functional unit.

13. The method of claim 12, wherein said state information includes a number of cycles that said at least one functional unit will be occupied by a multiple-cycle instruction.

14. The method of claim 12, wherein said reallocating step detects when said at least one functional unit is idle.

15. A method of processing instructions from a multithreaded instruction stream in a multithreaded very large instruction word processor, comprising the steps of:
    executing said instructions using a plurality of functional units;
    monitoring a number of cycles that at least one of said functional unit will be occupied; and
    reallocating said at least one functional unit when a currently executing instruction is complete in response to an indicator, wherein said indicator indicates a time that said currently executing instruction will be complete.

16. The method of claim 15, wherein said monitoring step is performed by a state machine.

17. The method of claim 15, wherein monitoring step monitors a number of cycles that said at least one functional unit will be occupied by a multiple-cycle instruction.

18. An article of manufacture for processing instructions from an instruction stream having a plurality of threads in a multithreaded very large instruction word processor, comprising:
    a computer readable medium having computer readable program code means embodied thereon, said computer readable program code means comprising program code means for causing a computer to:
    execute said instructions using a plurality of functional units; and
    reallocate at least one of said functional units to another thread when a currently executing instruction executed by said at least one functional unit is complete in response to an indicator, wherein said indicator indicates a time that said currently executing instruction will be complete.

19. An article of manufacture for processing instructions from an instruction stream having a plurality of threads in a multithreaded very large instruction word processor, comprising:
    a computer readable medium having computer readable program code means embodied thereon, said computer readable program code means comprising program code means for causing a computer to:
    execute said instructions using a plurality of functional units;
    monitor a number of cycles that at least one of said functional unit will be occupied; and
    reallocate said at least one functional unit when a currently executing instruction is complete in response to an indicator, wherein said indicator indicates a time that said currently executing instruction will be complete.

* * * * *